United States Patent
Shen et al.

(10) Patent No.: US 11,122,654 B2
(45) Date of Patent: Sep. 14, 2021

(54) FLICKER CONTROL FOR ELECTRIC ARC FURNACE

(71) Applicant: HATCH LTD., Mississauga (CA)

(72) Inventors: Dong Shen, Oakville (CA); Michael Morgan Campbell, Toronto (CA); Jason Cheung, Toronto (CA); James Wikston, Fonthill (CA)

(73) Assignee: Hatch Ltd., Mississauga (CA)

( * ) Notice: Subject to any disclaimer, the term of this patent is extended or adjusted under 35 U.S.C. 154(b) by 738 days.

(21) Appl. No.: 15/579,796

(22) PCT Filed: May 26, 2016

(86) PCT No.: PCT/CA2016/050595
§ 371 (c)(1),
(2) Date: Dec. 5, 2017

(87) PCT Pub. No.: WO2016/191861
PCT Pub. Date: Dec. 8, 2016

(65) Prior Publication Data
US 2018/0242411 A1    Aug. 23, 2018

Related U.S. Application Data

(60) Provisional application No. 62/171,696, filed on Jun. 5, 2015.

(51) Int. Cl.
*H05B 7/148* (2006.01)
*F27B 3/28* (2006.01)
(Continued)

(52) U.S. Cl.
CPC ............. *H05B 7/148* (2013.01); *F27B 3/085* (2013.01); *F27B 3/28* (2013.01); *F27D 11/08* (2013.01);
(Continued)

(58) Field of Classification Search
CPC . H05B 7/144; H05B 7/148; F27B 3/08; F27B 3/085; F27B 3/20; F27B 3/28;
(Continued)

(56) References Cited

U.S. PATENT DOCUMENTS

| 2,632,862 A | 3/1953 | Stoltz |
| 4,204,151 A | 5/1980 | Brennen et al. |

(Continued)

FOREIGN PATENT DOCUMENTS

| CA | 2260516 | 7/2000 |
| CA | 2463130 | 4/2003 |

(Continued)

OTHER PUBLICATIONS

International Search Report and Written Opinion, Application No. PCT/CA2016/050595 dated Jun. 30, 2016.

(Continued)

*Primary Examiner* — Justin C Dodson
(74) *Attorney, Agent, or Firm* — Ridout and Maybee LLP (57) ABSTRACT

It is proposed herein to employ thyristor firing angles as a fast prediction of flicker in power supply for an electric arc furnace. It is further proposed to actively modify operating variables for the electric arc furnace to maintain the flicker below a predefined threshold. Aspects of the present application use the thyristor firing angles in combination with control ranges of variable reactance devices to predict the flicker severity level generated by the electric arc furnace with thyristor-controlled variable reactance devices. Based on the predicted flicker level, at least one operating variable of the electric arc furnace may be changed, if required, to maintain flicker to acceptable limit.

23 Claims, 8 Drawing Sheets

(51) Int. Cl.
*F27B 3/08* (2006.01)
*F27D 21/00* (2006.01)
*F27D 11/08* (2006.01)
*F27D 19/00* (2006.01)
*H02J 3/18* (2006.01)

(52) U.S. Cl.
CPC ............. *F27D 19/00* (2013.01); *F27D 21/00* (2013.01); *H02J 3/1864* (2013.01); *Y02P 10/25* (2015.11)

(58) Field of Classification Search
CPC .......... F27D 11/00; F27D 11/08; F27D 19/00; F27D 2019/0028; F27D 2019/0037; F27D 2019/0071; F27D 2019/0075
See application file for complete search history.

(56) References Cited

U.S. PATENT DOCUMENTS

| | | | |
|---|---|---|---|
| 5,155,740 A | 10/1992 | Ao et al. | |
| 5,991,327 A * | 11/1999 | Kojori | C21C 5/5211 373/104 |
| 2008/0056327 A1 * | 3/2008 | Gerritsen | F27D 19/00 373/102 |
| 2008/0285615 A1 * | 11/2008 | Fink | F27D 21/00 373/104 |
| 2009/0238234 A1 * | 9/2009 | Schubert | H05B 7/148 373/104 |
| 2012/0183010 A1 | 7/2012 | Dittmer et al. | |
| 2014/0185645 A1 * | 7/2014 | Dobbeler | H05B 7/148 373/104 |
| 2015/0226484 A1 * | 8/2015 | Doebbeler | C21C 5/5211 373/104 |

FOREIGN PATENT DOCUMENTS

| | | |
|---|---|---|
| CN | 1052585 | 6/1991 |
| CN | 1502217 | 6/2004 |
| CN | 1605143 | 6/2005 |
| EP | 896067 | 11/2002 |
| JP | 5295343 A | 8/1977 |
| KZ | 26187 | 9/2002 |
| RU | 2268556 | 1/2006 |

OTHER PUBLICATIONS

International Preliminary Report on Patentability, Application No. PCT/CA2016/050595 dated Dec. 5, 2017.
Examination Report; Application No. 2,988,355 dated Dec. 28, 2017.
First Office Action; CN application No. 201680032751.9 dated Nov. 28, 2018.
EESR; EP 16802281.2 Nov. 30, 2018.
Communication Pursuant to Article 94(3); EP 16802281.2 dated Dec. 9, 2019.
Office Action; RU Application No. 2017146991 dated Nov. 28, 2019.

* cited by examiner

FLICKER CONTROL FOR ELECTRIC ARC FURNACE

FIELD

The present application relates generally to electric arc furnaces and, more specifically, to flicker control for such furnaces.

BACKGROUND

An electric arc furnace is a device in which charged material may be heated by means of an electric arc. Electric arc furnaces are used in a variety of applications in a wide range of scales, from a few dozen grams to hundreds of tons. One application for electric arc furnaces is secondary steelmaking.

In the steelmaking application, variations in the load experienced by the power grid that supplies electricity to the electric arc furnace give rise to something called "power grid flicker." Unfortunately, power grid flicker can be shown to cause malfunction in sensitive lighting. Furthermore, power grid flicker can be shown to disturb other consumers on the same power grid. Even further, excessive power grid flicker can violate an electricity contract entered into by the operator of the electric arc furnace.

BRIEF DESCRIPTION OF THE DRAWINGS

Reference will now be made, by way of example, to the accompanying drawings which show example implementations; and in which.

DETAILED DESCRIPTION

Traditionally, power grid flicker (or, simply, "flicker") may be mitigated by installing shunt reactive power compensation equipment. Examples of reactive power compensation equipment include a traditional Static VAR Compensator (SVC) or a more advanced power converter based Static Synchronous Compensator (STATCOM). Another proven technology for flicker reduction is a Smart Predictive Line Controller (SPLC), which may be connected in series with a fluctuating load.

In electric power transmission and distribution, volt-ampere reactive (VAR) is a unit in which reactive power is expressed in an alternating Current (AC) electric power system. Reactive power exists in an AC circuit when the current and voltage are not in phase.

An SVC consists of a shunt-connected harmonic filter bank and a shunt-connected thyristor-controlled reactor. The filter bank and the thyristor-controlled reactor operate in concert to lower voltage flicker or maintain a constant furnace power factor. The SVC operates by shunt injection of either capacitive or inductive reactive power, thereby maintaining a constant voltage by maintaining the total reactive power draw (MVAR) of the furnace balanced near zero (i.e., neither inductive or capacitive). SVCs typically have a half cycle time delay due to thyristor commutation requirements. An example of an early SVC can be seen in U.S. Pat. No. 3,936,727.

SVC-based arc furnace controllers dynamically supply reactive power by the controlled summation of constant capacitive MVAR and variable inductive MVAR. The controller compares load reactive power to a reactive power set-point derived from power factor set-point and dynamically controls the summated MVAR to the set-point. As an electric arc furnace frequently short circuits and open circuits on bore in of the furnace electrodes, the furnace reactive power swings vary from zero to 200% of the furnace transformer rating. An SVC is normally sized at 125% to 150% of the furnace rating and typically reduces flicker by approximately 40% to 50%. Some SVCs use a voltage set-point and adjust a shunt reactor to match a supply voltage to the set-point voltage.

An SPLC consists of a thyristor controlled reactor connected in series with an arc electrode of the electric arc furnace. An SPLC functions as a dynamically controlled series reactor that uses predictive software to stabilize the real power or the current on a electric arc furnace. The SPLC reduces flicker by lowering arc current fluctuations on the power systems. When arc current fluctuations are flat lined, the voltage flicker is reduced. An example of an SPLC can be seen in U.S. Pat. No. 5,991,327 issued Nov. 23, 1999.

Figure 1:
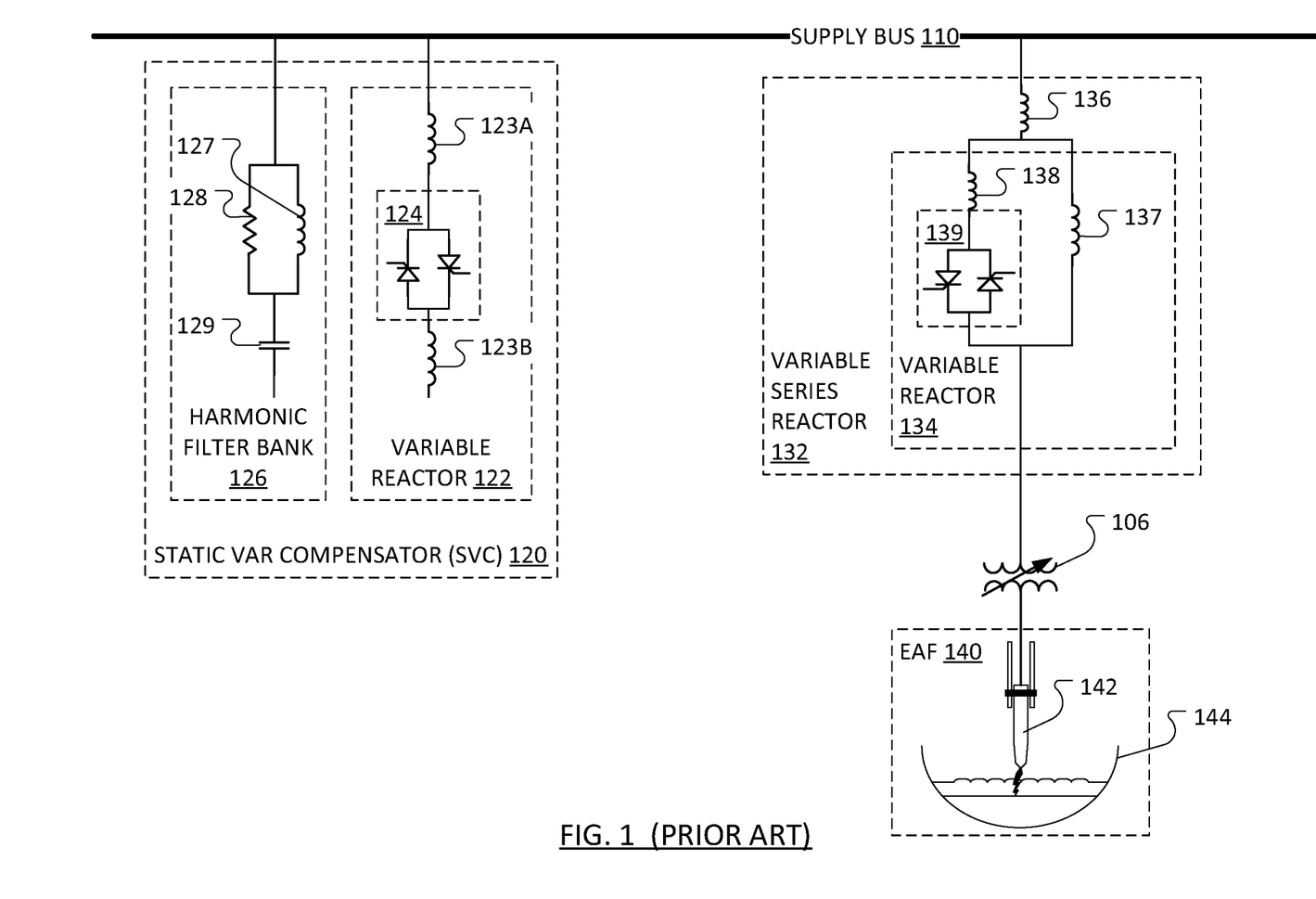
FIG. 1 illustrates a prior art system including a three electrode AC electric arc furnace in combination with flicker control in the form of a Static VAR Compensator (SVC) and a Variable Series Reactor (VSR)

FIG. 1 illustrates an example of a three electrode AC electric arc furnace (EAF) 140. Three phase power is provided to the electric arc furnace 140 from a local supply bus 110. The supply bus 110 is connected to receive power from a utility power supply through transmission line and step down transformer (not shown) or, alternatively, from a local generating station (not shown). The electric arc furnace 140 includes three electrodes 142 (not individually illustrated), with each of the three electrodes 142 being associated with one of the three power phases. Arcing ends of the electrodes 142 are positioned in a furnace vessel 144 to, for example, melt a work material, such as scrap metal, and may be mounted such that their position within the furnace vessel 144 can be adjusted. The electrodes 142 are connected to a furnace side (secondary windings) of a tapped furnace transformer 106.

A variable series reactor 132 is connected, in series, between the electric arc furnace 140 and the supply bus 110. Each of the three phases of the variable series reactor 132 (only one phase of which is illustrated) includes a series combination of a variable reactor 134 and a fixed reactor 136 connecting a respective phase of a supply side (primary windings) of the furnace transformer 106 to a corresponding phase of the supply bus 110. In the illustrated embodiment, the representative variable reactor 134 includes a first inductor 137 connected in parallel with a series combination of a second inductor 138 and a thyristor switch 139. Each thyristor switch 139 preferably includes a pair of thyristors, or pairs of thyristor groups, arranged in opposite polarity to each other. The variable series reactor 132 has a control range. The thyristor switch 139 may be considered to be a specific implementation of what may be called a power electronics static switch.

FIG. 1 also illustrates an SVC 120 connected to the supply bus 110. As part of the SVC 120, an inductive shunt reactor is connected across the supply bus 110 in parallel with the series combination of the arc furnace 140 and variable series reactor 132. The inductive shunt reactor includes three variable reactors connected in delta circuit configuration Only a representative one of the three variable reactors is illustrated in FIG. 1 and is associated with reference number 122. Each of the variable reactors 122 includes a series-connected pair of fixed inductors 123A, 123B with an AC thyristor switch 124 connected between the fixed inductors 123A, 123B. Each thyristor switch 124 preferably includes a pair of thyristors, or pairs of thyristor groups, arranged in opposite polarity to each other. The SVC 120 has a control range.

Also installed as part of the SVC 120 is a harmonic filter bank 126, which can be implemented using a shunt connected capacitance. The harmonic filter bank 126 is connected to the supply bus 110 to function as a source of compensating reactive current and removing harmonic distortions that occur as a result of the arcing process, as is known in the art. In one configuration, the harmonic filter bank 126 includes at least one bank of fixed capacitors 129 connected to the supply bus 110 in wye connected circuit relation through a tuning inductance 127 and a damping resistor 128. Typically more than one bank of fixed capacitors 129 is connected, though only a representative one is illustrated.

In operation, the harmonic filter bank 126 may be tuned to the predominant harmonic frequencies generated by the arcing process carried out in the electric arc furnace 140 to impede these harmonics from entering the supply network. The harmonic filter bank 126 and variable inductive shunt reactor 122 of the SVC 120 are collectively used to counteract a reactive power draw of the electric arc furnace 140 and the variable series reactor 132.

Figure 2:
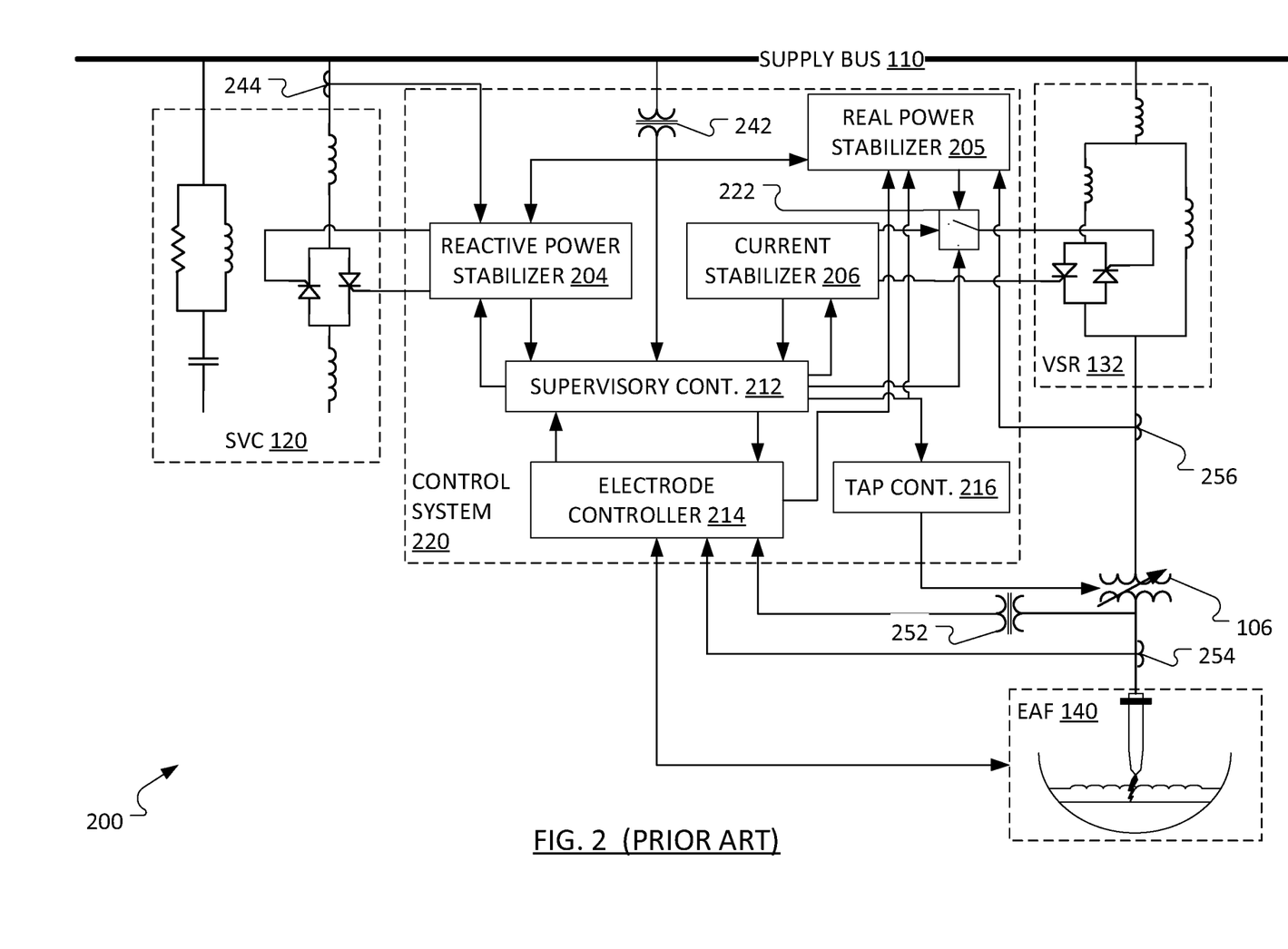
FIG. 2 illustrates the system of FIG. 1 with the SVC and VSR augmented with a control system.

As illustrated in FIG. 2, a control system 220 may be introduced to control the operation of the variable series reactor 132 and the SVC 120 in order to control voltage flicker. The control system 220, in one embodiment, controls four elements in order to reduce voltage flicker and to reduce real power fluctuations. The controlled elements include: the value of the variable reactors 134 of the variable series reactor 132; the value of the variable reactors 122 of the SVC 120; the tap position of the furnace transformer 106; and the height of the electrodes 142. In one embodiment, the control system 220 includes a supervisory controller 212, a reactive power stabilizer 204, a current stabilizer 206, a real power stabilizer 205, a tap controller 216 and an electrode controller 214.

In operation, the supervisory controller 212 coordinates the operation of the components of the control system 220. The supervisory controller 212 includes a flicker meter (not shown), which is connected, through a voltage transducer 242, to the supply bus 110 in order to monitor the per phase supply line voltages (VL-G). The flicker meter uses commonly known technology to output a signal that is representative of the magnitude and frequency of fluctuations in the supply line voltage. For example, the flicker meter may output a signal or signals that conform(s) to the known International Electrotechnical Commission (IEC) 61000-4-15 standard. The supervisory controller 212 further includes a suitably configured logic device for automatically interpreting the output the flicker meter and sending operative signals to coordinate the operation of the other components of the control system 220 as described in the following.

The current stabilizer 206 may be operable to control voltage flicker primarily during a "bore-in" stage and into a "long arc melting" stage of the furnace process cycle when large magnitude, low frequency voltage fluctuations tend to occur. In this regard, the current stabilizer 206 is configured to gate the thryristors 139 of the variable series reactor 132 to match the current draw of the furnace electrodes 142 to a set-point value to maintain a relatively constant furnace load impedance during periods during which large arc impedance swings are occurring. The current stabilizer 206 can be tuned to respond to supply current fluctuations falling only within specified ranges, for example, the low frequency fluctuations that occur during the bore-in stage. Furthermore, the tuning can be varied throughout the arc furnace process cycle to focus the operation of the current stabilizer 206 on different fluctuation ranges at different times during the process cycle.

In one embodiment, the control system 220 includes a switch 222 that the supervisory controller 212 operates to selectively connect either the current stabilizer 206 or the real power stabilizer 205 to control the thyristors 139 of the variable series reactor 132. For example, the supervisory controller 212 may be configured to switch the thyristors 139 to real power stabilizer 205 control from current stabilizer 206 control once the flicker meter readings indicate that flicker has dropped below a predetermined threshold.

Broadly stated, the current stabilizer 206 is configured to respond to current fluctuations occurring within fluctuation ranges specified by the supervisory controller 212 to match the current supplied to the furnace to a set-point supply current specified by the supervisory controller 212. The current stabilizer 206 may be implemented using a number of different configurations, for example, one or more suitably programmed real time industrial computers, or other programmable logic controllers, could be used in combination with commercially available digitally tuned filters to implement current stabilizer 206.

The reactive power stabilizer 204 may be operable to control voltage flicker primarily after the bore-in stage of the furnace process cycle, namely during portions of a long arc melting stage and a long arc foamy slag heating stage, when lower magnitude, higher frequency voltage fluctuations dominate the flicker. In this regard, the reactive power stabilizer 204 may be configured to gate the thyristor switch 124 of the SVC 120 to maintain the total reactive power draw substantially constant and balanced at a low value (preferably close to zero). The total reactive power draw may be associated with the furnace 140 (including the variable series reactor 132), the harmonic filter bank 126 and the variable reactor 122.

The reactive power stabilizer 204 may be implemented using a number of different configurations, for example, one or more suitably programmed real time industrial computers, or other programmable logic devices, could be used in combination with commercially available digitally tuned filters. In one embodiment, the reactive power stabilizer 204 may monitor, using a current transducer 244, current through the variable reactor 122 of the SVC 120.

In one embodiment, the electrode controller 214 may monitor, using current transducers 254, current into each electrode 142. Additionally, the electrode controller 214 may monitor, using voltage transducer 252, voltage at the secondary side of the transformer 106. Furthermore, the real power stabilizer 205 may monitor, using current transducers 256, current through the variable series reactor 132.

The real power stabilizer 205 may be operable to work in conjunction with the electrode controller 214 to maintain a consistent active power (MW) draw by the furnace 140 after the bore-in stage and the long arc melting stage have occurred. The real power stabilizer 205 may regulate the variable series reactor 132 once the switch 222 has been switched to it by the supervisory controller 212 so that the real power consumption by the furnace 140 tracks a desired power set-point in the presence of arc impedance fluctuations. Preferably, thyristor firing angles of the variable series reactor 132 is periodically adjusted, at least once during each AC line voltage half cycle, when the real power stabilizer 205 is operating.

Various modules internal to the real power stabilizer 205 can conveniently be implemented using a suitably programmed industrial PC, however it will be understood by those skilled in the art that the functionality of such modules could be implemented using a number of different possible hardware and/or software configurations.

The presence of the fixed reactor 136 in series with the variable reactor 134 in each phase helps maintain the average furnace power factor within a specific range as measured at the voltage supply bus, especially in a situation where the reactance 137 is completely shorted. With the fixed reactor 136 in place, a variation in arc resistance can be compensated for by changing the reactance of the variable reactor 134 by a magnitude that is equal to or less than that of the arc resistance variation. Under these conditions, the resulting reactive power draw from the supply bus 110 may be seen to have been minimized. The second inductor 138, which is optional, serves to protect the thyristor switch 139 from damaging short circuit currents. In some cases, the inductor 138 could be connected downstream of the thyristor switch 139.

Turning now to regulation of the electrode positions, the control system 220 includes the electrode controller 214 for regulating an electrode movement system (not shown) to adjust the height of the electrodes 142 relative to the furnace vessel 144. As will be described in greater detail below, the electrode controller 214 is configured to monitor, on an ongoing basis, various furnace operating conditions, such as electrode voltages, electrode currents, power consumption and electrode movements. The electrode controller 214 may be operable in the mode of Voltage Control, Current Control or Impedance Control. The monitored process variables, and changes in the monitored process variables, are compared against stored values and variation patterns that have been predetermined to be indicative of a number of different types of furnace upset conditions. Based on characteristic signatures in the variations of the furnace process variables, the electrode controller 214 may predict the onset of one of a number of different possible furnace upset conditions and may regulate the height of the electrodes 142 in a manner that is appropriate for the specific upset condition. Insufficient slag foaming may be considered as an example of a furnace upset condition. Through upset condition specific regulation, the electrode position controller attempts to reduce power swings while also maintaining process energy efficiency, furnace structural integrity and power system electrical balance. The electrode movement system may be implemented as a winch-driven system or a hydraulic cylinder driven system, among further alternative systems.

It is proposed herein to employ thyristor firing angles as a fast prediction of the flicker. It is further proposed to actively modify operating variables for the electric arc furnace to maintain the flicker below a predefined threshold. Aspects of the present application use the thyristor firing angles in combination with control ranges of variable reactance devices to predict the flicker severity level generated by the electric arc furnace 140 with thyristor-controlled variable reactance devices. Based on the predicted flicker level, at least one operating variable of the electric arc furnace 140 may be changed, if required, to maintain flicker to acceptable level. Additionally, flicker may also be maintained to an acceptable level through control of operating variables of the SVC 120 and the VSR 132.

According to an aspect of the present disclosure, there is provided a method of operating an electric arc furnace. The method includes receiving indications of a plurality of operating variables of the electric arc furnace, receiving indications of firing angles in a variable reactance device controlled by a plurality of thyristor switches, the variable reactance device having a control range and determining a predicted flicker based upon: the operating variables; the firing angles; and the control range. The method further includes determining that the predicted flicker exceeds the predefined threshold, determining an adjustment to at least one operating variable among the plurality of operating variables and transmitting, to a controller of the at least one operating variable, instructions to adjust the at least one operating variable.

According to another aspect of the present disclosure, there is provided a power control system. The power control system includes measuring equipment configured to monitor a plurality of operating variables of an electric arc furnace and an actuator for a variable reactance device controlled by a plurality of thyristor switches, the actuator configured to monitor firing angles of the plurality of thyristor switches, the variable reactance device having a control range. The power control system further includes an analyzing device configured to determine a predicted flicker based upon: the operating variables; the firing angles; and the control range. The analyzing device configured to determine that the predicted flicker exceeds the predefined threshold and transmit an indication that the predicted flicker exceeds the predefined threshold. The power control system further includes an override controller configured to: receive the indication; determine an adjustment to at least one operating variable among the plurality of operating variables; and transmit instructions representative of the adjustment.

According to a further aspect of the present disclosure, there is provided method of operating an electric arc furnace. The method includes receiving indications of a plurality of operating variables of the electric arc furnace, receiving indications of a switching pattern in a device controlled by insulated-gate bipolar transistors (IGBTs), the device having a control range and determining a predicted flicker based upon: the operating variables; the switching pattern; and the control range. The method further includes determining that the predicted flicker exceeds the predefined threshold, determining an adjustment to at least one operating variable among the plurality of operating variables and transmitting, to a controller of the at least one operating variable, instructions to adjust the at least one operating variable.

According to a still further aspect of the present disclosure, there is provided an electric arc furnace system. The system includes an electric arc furnace, a variable reactance device controlled by a of thyristor switches and having a control range, an actuator for the variable reactance device, the actuator configured to monitor firing angles for the plurality of thyristor switches, measuring equipment configured to monitor a plurality of operating variables of the electric arc furnace, an analyzing device and an override controller. The analyzing device is configured to determine a predicted flicker based upon: the operating variables; the generic firing angles term; and the control range. The analyzing device is also configured to determine that the predicted flicker exceeds the predefined threshold and transmit an indication that the predicted flicker exceeds the predefined threshold. The override controller configured to receive the indication, determine an adjustment to at least one operating variable among the plurality of operating variables and transmit instructions representative of the adjustment.

Other aspects and features of the present disclosure will become apparent to those of ordinary skill in the art upon review of the following description of specific implementations of the disclosure in conjunction with the accompanying figures.

Figure 3:
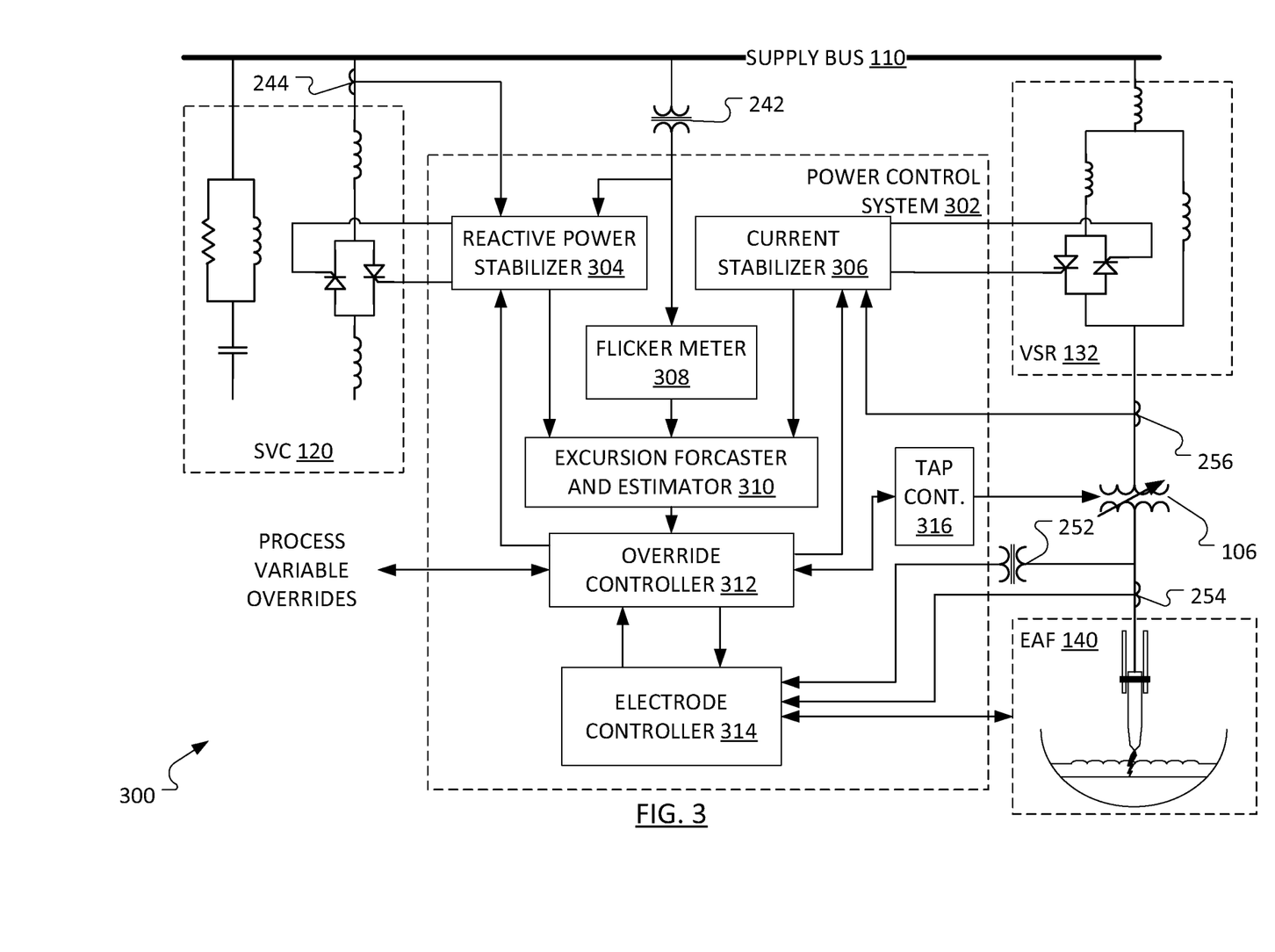
FIG. 3 illustrates a power control system for an electric arc furnace, as an alternative to the control system of FIG. 2.

FIG. 3 illustrates a power control system 302 as an alternative to the control system 220 of FIG. 2. The power control system 302 may be operable to control the operation of the variable series reactor (VSR) 132 and the SVC 120 to control voltage flicker. The power control system 302, in one embodiment, controls various operating electrical variables to reduce voltage flicker and to reduce real power fluctuations. The controlled operating electrical variables include: the value of the variable reactors 134 of the variable series reactor 132; the value of the variable reactors 122 of the SVC 120; the tap position of the furnace transformer 106; and the height of the electrodes 142. In one embodiment, the power control system 302 includes (in common with the control system 220 of FIG. 2) a reactive power stabilizer 304, a current stabilizer 306, a tap controller 316 and an electrode controller 314. In place of the supervisory controller 212 of the control system 220 of FIG. 2, the power control system 302 of FIG. 3 includes a flicker meter 308, an excursion forecaster and estimator 310 and an override controller 312. The flicker meter 308 is connected, through the voltage transducer 242, to the supply bus 110.

In one embodiment, the electrode controller 314 may monitor, using current transducers 254, current into each electrode 142. Additionally, the electrode controller 314 may monitor, using voltage transducers 252, voltage at the secondary side of the transformer 106. Furthermore, the current stabilizer 306 may monitor, using current transducers 256, current through the variable series reactor 132.

Figure 4:
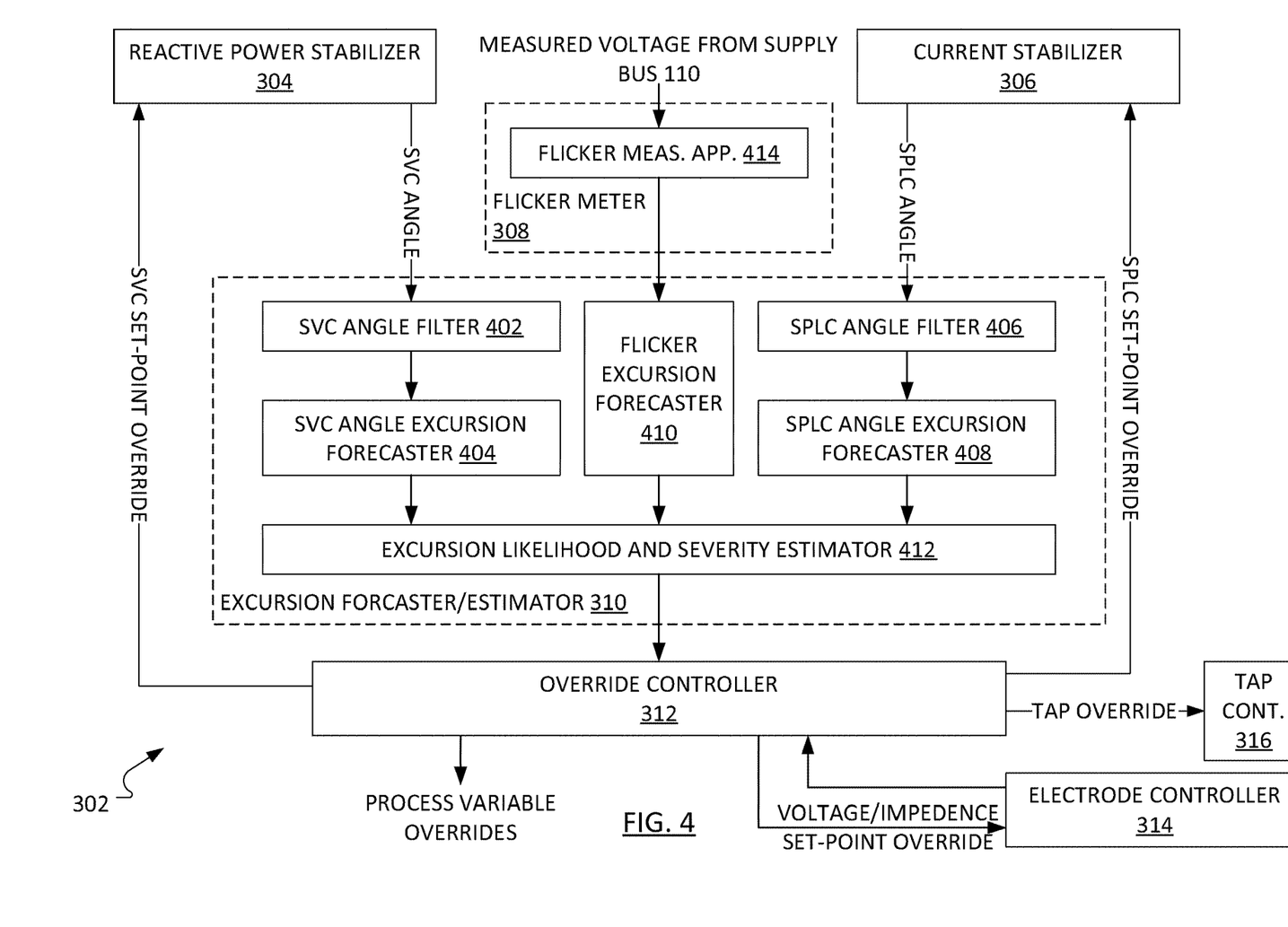
FIG. 4 illustrates the power control system of FIG. 3 in greater detail, the power control system including actuators for variable reactance devices, an excursion forecaster and estimator and an override controller.

FIG. 4 illustrates the power control system 302 of FIG. 3 in greater detail. In particular, the flicker meter 308 is illustrated as including a flicker measuring apparatus 414. Furthermore, the excursion forecaster and estimator 310 is illustrated as including an excursion likelihood and severity estimator 412, which is arranged to transmit output to the override controller 312. The excursion likelihood and severity estimator 412 is illustrated as receiving input from three forecasters: an SVC angle excursion forecaster 404; an SPLC angle excursion forecaster 408; and a flicker excursion forecaster 410. The SVC angle excursion forecaster 404 receives its input from an SVC angle filter 402. The SPLC angle excursion forecaster 408 receives its input from an SPLC angle filter 406.

In overview, the thyristor firing angles and control ranges of variable reactance devices may be used to predict a severity level for flicker generated by the electric arc furnace 140 with thyristor-controlled variable reactance devices. Based on the predicted flicker level, at least one operating variable of the electric arc furnace 140 may be changed, if required, to maintain flicker to acceptable level.

In operation, through electrical measuring equipment, including the flicker meter 308, the voltage measuring equipment 242, 252 and the current measuring equipment 244, 254, 256, a plurality of operating electrical variables of the electric arc furnace 140 may be monitored. Through the electrode controller 314, the override controller 312 and the voltage transducers 252, indications of some the plurality of operating electrical variables may reach the excursion forecaster and estimator 310.

Additionally, the reactive power stabilizer 304 may monitor firing angles in the thyristor switch 124 of the SVC 120 and the current stabilizer 306 may monitor firing angles in the thyristor switch 139 of the variable series reactor 132. Generally, the reactive power stabilizer 304 may be considered to be an actuator for the SVC 120 and the current stabilizer 306 may be considered to be an actuator for the variable series reactor 132. The actuators transmit indications of the firing angles to the excursion forecaster and estimator 310. In one embodiment, the reactive power stabilizer 304 may monitor, using the current transducer 244, current through the variable reactor 122 of the SVC 120.

Figure 5:
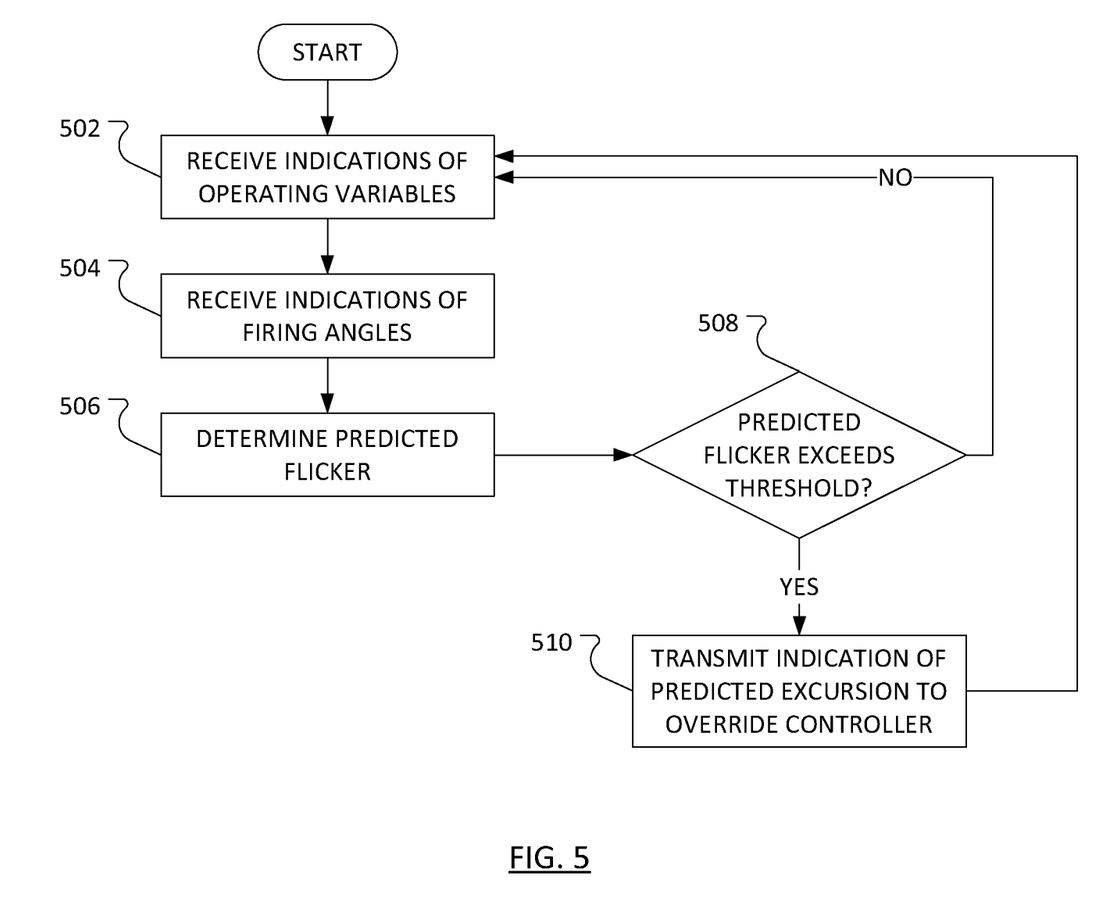
FIG. 5 illustrates example steps in a method of predicting flicker at the excursion forecaster and estimator.

FIG. 5 illustrates example steps in a method of predicting a flicker excursion. The excursion likelihood and severity estimator 412 may, initially, receive (step 502) indications of operating variables. These operating variables may include, as has been discussed, electrical variables, such as variable representative of currents and voltages. The operating variables may also include chemical variables related to the operation of the electric arc furnace 140.

The operating electrical variables may include: a current drawn by each of the three electrodes of the electric arc furnace 140; a voltage across each of the three phases of the electric arc furnace 140; and a flicker excursion forecast from the flicker excursion forecaster 410.

The operating chemical variables may, for but a few examples, include: burner power; Oxygen flow rate; Natural Gas flow rate; Carbon injection flow rate; and Lime injection flow rate.

The flicker excursion forecaster 410 is connected, through the voltage transducer 242, to the supply bus 110 for the monitoring thereof. More particularly, the flicker measuring apparatus 414, may, for example, be constructed according to Section 15 of the IEC 61000-4 standard. Section 15 of the IEC 61000-4 standard gives a functional and design specification for flicker measuring apparatus intended to indicate the correct flicker perception level for all practical voltage fluctuation waveforms. Section 15 of the IEC 61000-4 standard also provides a method for the evaluation of flicker severity.

The excursion likelihood and severity estimator 412 may also indirectly receive (step 504) the indications of the firing angles from the actuators.

In operation, the SVC angle excursion forecaster 404 receives a filtered indication of each SVC firing angle from each of the three SVC angle filters 402 (one for each phase). The SVC angle filter 402 receives indications of SVC firing angles from the reactive power stabilizer 304.

Similarly, the SPLC angle excursion forecaster 408 receives a filtered indication of each SPLC firing angle from each of the three SPLC angle filters 406 (one for each phase). The SPLC angle filter 406 receives indications of SPLC firing angles from the current stabilizer 306.

The excursion likelihood and severity estimator 412 may then determine (step 506), based upon input from the SVC angle excursion forecaster 404, the SPLC angle excursion forecaster 408 and the flicker excursion forecaster 410, a predicted flicker. The excursion likelihood and severity estimator 412 may, furthermore, determine (step 508) whether the predicted flicker is representative of a likely excursion. Responsive to determining (step 508) that the predicted flicker is representative of a likely excursion, the excursion likelihood and severity estimator 412 may transmit (step 510) an indication of the predicted flicker excursion to the override controller 312 along with an estimate of the severity of the predicted flicker excursion.

Figure 6:
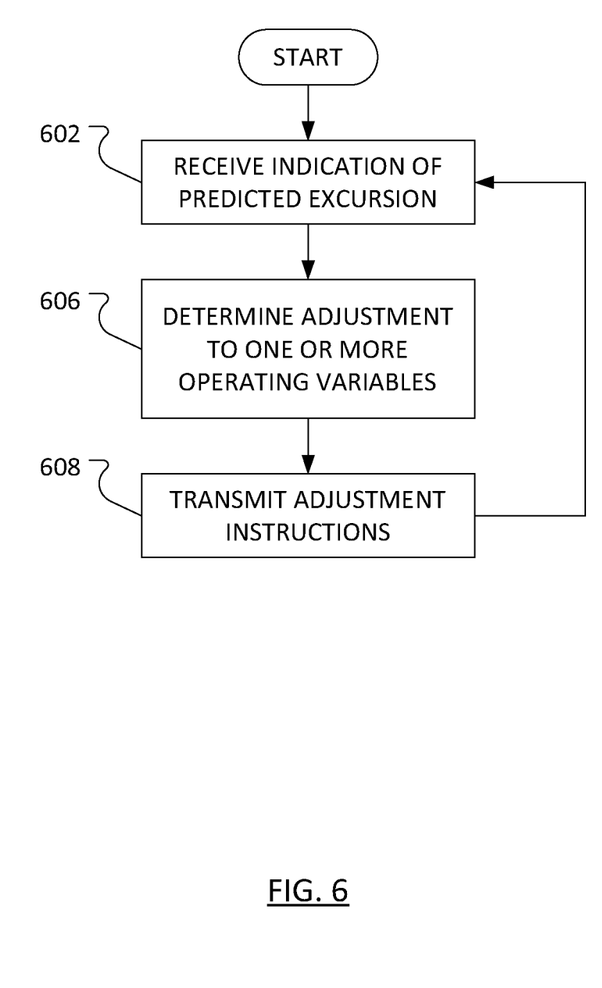
FIG. 6 illustrates example steps in a method of determining, at the override controller, adjustments to operating electrical and process variables for the electric arc furnace.

FIG. 6 illustrates example steps in a method of determining adjustments to operating electrical and chemical variables for the electric arc furnace 140. The override controller 312 may receive (step 602) the indication of the predicted flicker excursion from the excursion forecaster and estimator 310. Upon receiving (step 602) the indication of the predicted flicker excursion, the override controller 312 may determine (step 606) an adjustment to at least one operating variable among the plurality of operating variables. The override controller 312 may then transmit (step 608) an output representative of the adjustment determined in step 606. That is, the override controller 312 may transmit (step 608) adjustment instructions to actuators for variable reactance devices. The variable reactance devices may include the SVC 120 and the variable series reactor 132. The actuators for the variable reactance devices may include the reactive power stabilizer 304 and the current stabilizer 306. The override controller 312 may also transmit (step 608) adjustment instructions to the electrode controller 314, to the tap controller 316 and also to the electric arc furnace 140. The adjustment instructions sent to the electric arc furnace 140 may relate to the various operating chemical variables.

The output representative of the adjustment may, for example, take the form of an SVC set-point override. The override controller 312, in this case, transmits (step 608) the SVC set-point override to the reactive power stabilizer 304.

The output representative of the adjustment may, for example, take the form of an SPLC set-point override. The override controller 312, in this case, transmits (step 608) the SPLC set-point override to the current stabilizer 306.

The output representative of the adjustment may, for example, take the form of a tap override. The override controller 312, in this case, transmits (step 608) the tap override to the tap controller 316.

The output representative of the adjustment may, for example, take the form of an electrode voltage and/or impedance set-point adjustment instruction. The override controller 312, in this case, transmits (step 608) the electrode voltage and/or impedance set-point adjustment instruction to the electrode controller 314.

The output representative of the adjustment may, for example, take the form of a chemical override. The override controller 312, in this case, transmits (step 608) the chemical override to a respective process controller for the electric arc furnace 140 for control of, for example, Oxygen, Natural gas, or Carbon.

It is known that, responsive to sensing excessive, one or more of the electrodes 142 in the electric arc furnace 140 may be aggressively withdrawn from the material. The current stabilizer 206 limits the excessive electrode current, so the aggressive withdraw of the electrode from the material may not be required. The output representative of the adjustment may, for example, take the form of an adjustment to a speed at which the electrode 142 is withdrawn from the material in the electric arc furnace 140. Indeed, by slowing the withdrawal of one or more of the electrodes 142, based on predicted flicker, loss of arc in the electric arc furnace 140, which may be seen as a main contributors to flicker, may be minimized.

Figure 7:
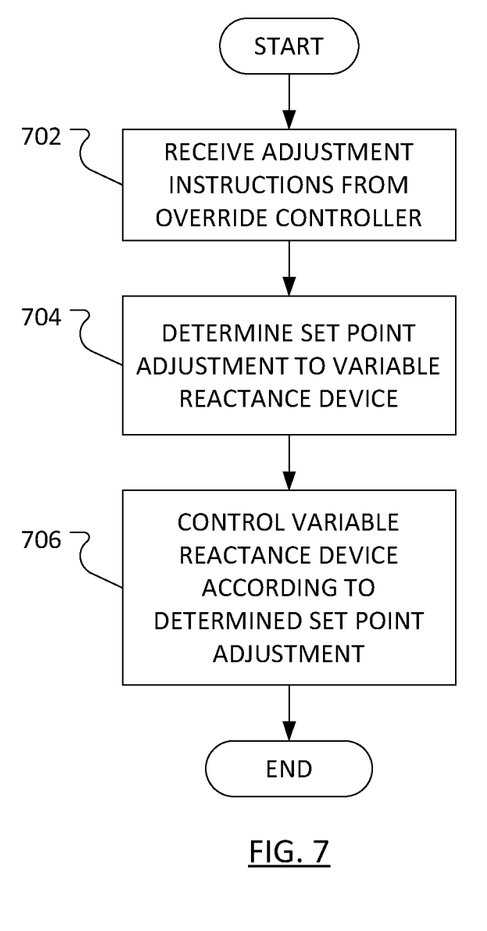
FIG. 7 illustrates example steps for a method of operating, responsive to adjustment instructions received from the override controller, one of the actuators for the variable reactance devices.

FIG. 7 illustrates example steps for a method of operating one of the actuators (304, 306) for the variable reactance devices (120, 132). Initially, the actuator receives (step 702) the set-point adjustment instructions from the override controller 312. Based on the received instructions, the actuator determines (step 704) a manner in which to adjust the set-point for the associated variable reactance device. The actuator may then control (step 706) the associated variable reactance device in accordance with the determination made in step 704.

Figure 8:
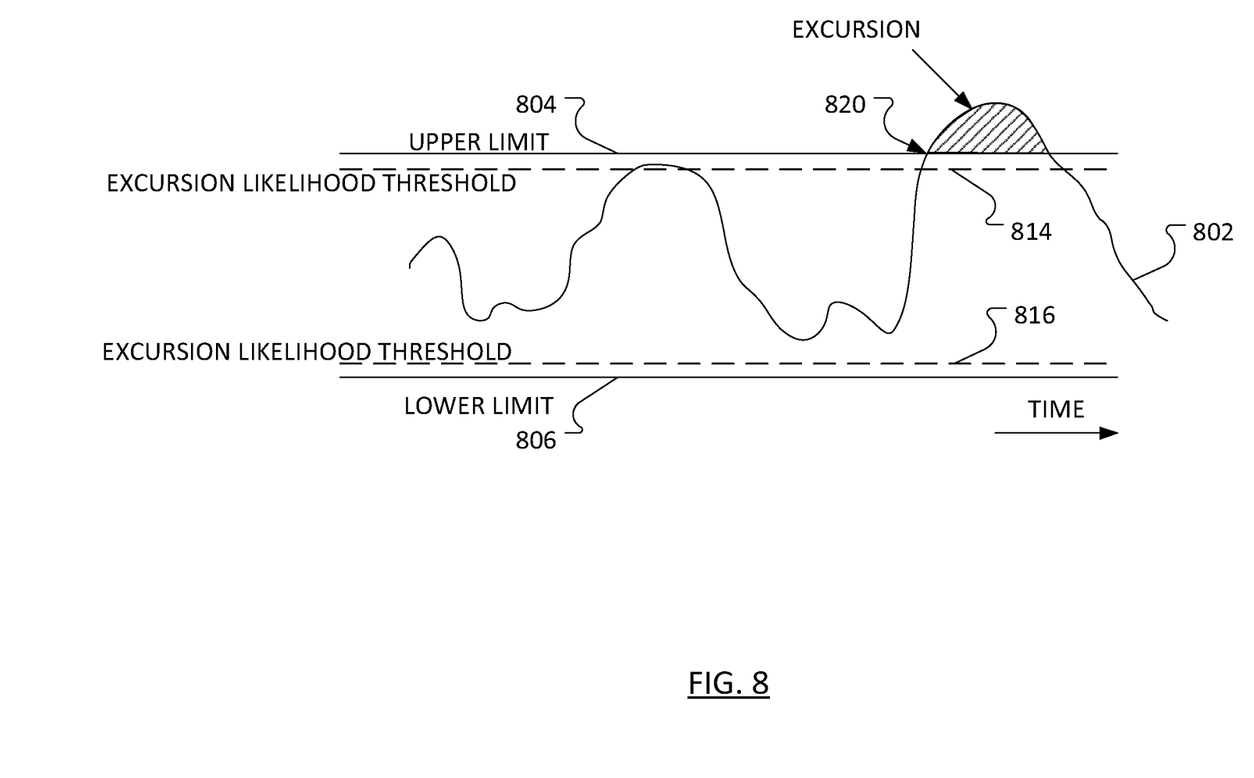
FIG. 8 illustrates a plot of monitored firing angle vs. time for a variable reactance device.

FIG. 8 illustrates a plot of monitored firing angle vs. time for a variable reactance device. A trace 802 of firing angle is illustrated relative to various thresholds. In particular, an upper limit 804 is illustrated along with a lower limit 806. Additionally, an upper excursion likelihood threshold 814 is illustrated along with a lower excursion likelihood threshold 816. The trace 802 may be representative of a firing angle at the SVC 120, which firing angle is to be monitored by the SVC excursion forecaster 404. Alternatively, the trace 802 may be representative of a firing angle at the variable series reactor 132, which firing angle is to be monitored by the SPLC angle excursion forecaster 408.

In operation, upon determining that the firing angle has surpassed the upper excursion likelihood threshold 814, either the SVC angle excursion forecaster 404 or the SPLC angle excursion forecaster 408 may provide, to the excursion likelihood and severity estimator 412, an indication that a firing angle excursion is forecasted. Similarly, upon determining that the firing angle has reduced below the lower excursion likelihood threshold 816, either the SVC angle excursion forecaster 404 or the SPLC angle excursion forecaster 408 may provide, to the excursion likelihood and severity estimator 412, an indication that a firing angle excursion is forecasted.

Upon receiving an indication that a firing angle excursion is forecasted, the excursion likelihood and severity estimator 412 may estimate a likelihood and a severity of an event wherein the flicker exceeds a predetermined threshold.

Furthermore, upon determining that the firing angle has surpassed the upper limit 804, either the SVC angle excursion forecaster 404 or the SPLC angle excursion forecaster 408 may provide, to the excursion likelihood and severity estimator 412, an indication that a firing angle excursion has occurred, along with an indication of the slope of the trace 802 at a point 820 at which the trace 802 surpassed the upper limit 804 and an indication of duration of the excursion. Similarly, upon determining that the firing angle has reduced below the lower limit 806, either the SVC angle excursion forecaster 404 or the SPLC angle excursion forecaster 408 may provide, to the excursion likelihood and severity estimator 412, an indication that a firing angle excursion has occurred, along with an indication of the slope of the trace 802 at the point (not shown) at which the trace 802 ducked below the lower limit 806 and an indication of duration of the excursion.

As discussed hereinbefore, upon receiving an indication that a firing angle excursion has occurred, the excursion likelihood and severity estimator 412 may estimate a likelihood and a severity of an event wherein the flicker exceeds a predetermined threshold. The estimation of the severity of the event may be based on the indicated slope and the indicated duration of the excursion.

As has been noted hereinbefore, a STATCOM provides the reactive power compensation and may be used in place of the SVC 120. Notably, STATCOM is power converter based device and does not employ thyristors. Instead of thyristors, STATCOM devices employ insulated-gate bipolar transistors (IGBTs) or other fast switching power electronics switches. Accordingly, rather than monitor firing angles in the thyristor switch 124 of the SVC 120, the reactive power stabilizer 304 may monitor switching pattern in the IGBTs of the STATCOM.

Conveniently, aspects of the present disclosure may be applied where an electric arc furnace is used in steelmaking in conjunction with variable reactance devices (SVC 120, variable serial reactor 132). An implementation of aspects of the present disclosure may be seen to be a small addition to an existing control system with relatively low cost and relatively high performance enhancement of flicker control.

Rather than adding aspects of the present disclosure to an existing system, aspects of the present disclosure may be offered in an integrated control system with new thyristor-controlled devices.

To this point, the electric arc furnace 140 has been discussed as having application in steelmaking and having three electrodes, one for each phase. It should be noted that aspects of the present application may apply in situations wherein the electric arc furnace 140 has more than three electrodes. For example, electric arc furnaces are known with six electrodes, arranged in three pairs. Furthermore, electric arc furnaces are known for use in non-ferrous applications and that flicker control in situations wherein such non-ferrous furnaces are in use remains well within the scope of the present application.

Notably, it may be shown that the VSR 132 reduces MVAR swings during short circuits at the electric arc furnace 140. In the absence of the VSR 132, such MVAR swings are typically handled by the SVC 120. In the presence of the VSR 132, it may be considered that the SVC 120 has been unburdened from handling such MVAR swings. Accordingly, it may be shown that, in the presence of the VSR 132, the SVC 120 has a greater capacity for compensating MVAR. Since the SVC 120 arranges for phase balance control, which arranging involves MVAR compensation additional capacity, the VSR 132 may be seen to enable the SVC 120 to do a better job of voltage control and phase balance control at the same time.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of operating an electric arc furnace, the method comprising:
   receiving indications of a plurality of operating variables of the electric arc furnace, wherein the operating variables include a flicker of a power grid supplying the electric arc furnace;
   receiving indications of firing angles of a plurality of thyristor switches in a variable reactance device controlled by the plurality of thyristor switches, the variable reactance device having a control range;
   predicting a power grid flicker based upon:
      the received indications of the plurality of operating variables;
      the received indications of the firing angles of the plurality of thyristor switches; and
      the control range of the variable reactance device;
   determining that the predicted power grid flicker is a power grid flicker excursion, wherein the predicted power grid flicker exceeds a predefined threshold, based on:
      determining that at least one of the received indications of the firing angles of the plurality of thyristor switches is at one of: at or above a firing angle upper excursion likelihood threshold, or at or below a firing angle lower excursion likelihood threshold;
   determining, upon receiving an indication of the predicted power grid flicker excursion, an adjustment to at least one operating variable among the plurality of operating variables; and
   transmitting, to a controller of the at least one operating variable, instructions to adjust the at least one operating variable such that the predicted power grid flicker remains below the predefined threshold, with effect that the predicted power grid flicker excursion is avoided.

2. The method of claim 1 wherein the plurality of operating variables comprises a plurality of operating electrical variables.

3. The method of claim 2 wherein the plurality of operating electrical variables comprises signals that are representative of supply currents drawn by each phase of the electric arc furnace.

4. The method of claim 2 wherein the plurality of operating electrical variables comprises signals that are representative of supply voltage at each phase of the electric arc furnace.

5. The method of claim 2 wherein the plurality of operating electrical variables comprises signals that are representative of an electrode current drawn by each phase of the electric arc furnace.

6. The method of claim 2 wherein the plurality of operating electrical variables comprises signals that are representative of per phase electrode voltages of the electric arc furnace.

7. The method of claim 1 wherein the plurality of operating variables comprises a plurality of operating chemical variables.

8. The method of claim 7 wherein the plurality of operating chemical variables comprises a burner power.

9. The method of claim 7 wherein the plurality of operating chemical variables comprises an Oxygen flow rate.

10. The method of claim 7 wherein the plurality of operating chemical variables comprises a Natural Gas flow rate.

11. The method of claim 7 wherein the plurality of operating chemical variables comprises a Carbon injection flow rate.

12. The method of claim 7 wherein the plurality of operating chemical variables comprises a Lime injection flow rate.

13. The method of claim 1 wherein the variable reactance device comprises a static VAR compensator.

14. The method of claim 13 wherein the static VAR compensator comprises a variable reactor.

15. The method of claim 14 wherein the variable reactor comprises a series-connected pair of fixed inductors and the plurality of thyristor switches connected between the fixed inductors.

16. The method of claim 15 wherein the controller comprises a reactive power stabilizer and the instructions comprise instructions to adjust firing angles for the plurality of thyristor switches.

17. The method of claim 1 wherein the variable reactance device comprises a variable series reactor.

18. The method of claim 17 wherein the variable series reactor comprises a variable reactor in series with a fixed reactor.

19. The method of claim 18 wherein the variable reactor comprises a first inductor connected in parallel with a series combination of a second inductor and the plurality of thyristor switches.

20. The method of claim 19 wherein the controller comprises a current stabilizer and the instructions comprise instructions to adjust firing angles for the plurality of thyristor switches.

21. The method of claim 1 wherein the controller comprises a tap controller for a furnace transformer and the instructions comprise instructions to adjust the tap position of the furnace transformer.

22. The method of claim 1 wherein the controller comprises an electrode controller and the instructions comprise instructions to adjust a position of electrodes in the electric arc furnace.

23. The method of claim 22 wherein the instructions to adjust a position of electrodes in the electric arc furnace include an indication of a speed at which to adjust the position.

* * * * *